United States Patent
Huang (10) Patent No.: US 12,224,613 B2
(45) Date of Patent: Feb. 11, 2025

(54) CHARGING SYSTEM AND CHARGING METHOD OF UNIVERSAL SERIAL BUS

(71) Applicant: Ark Semiconductor Corp. Ltd., Shenzhen (CN)

(72) Inventor: Li-Hsin Huang, Shenzhen (CN)

(73) Assignee: ARK MICROELECTRONIC CORP. LTD., Guangdong (CN)

( * ) Notice: Subject to any disclaimer, the term of this patent is extended or adjusted under 35 U.S.C. 154(b) by 708 days.

(21) Appl. No.: 17/516,644

(22) Filed: Nov. 1, 2021

(65) Prior Publication Data

US 2022/0200294 A1    Jun. 23, 2022

(30) Foreign Application Priority Data

Dec. 21, 2020   (CN) .......................... 202011518778.3

(51) Int. Cl.
*H02J 7/00* (2006.01)
*G06F 1/26* (2006.01)
*G06F 13/42* (2006.01)

(52) U.S. Cl.
CPC ................ *H02J 7/007* (2013.01); *G06F 1/26* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| 2015/0015076 | A1  | 1/2015 | Park |
| 2015/0160674 | A1* | 6/2015 | Burdette ............... G06F 13/385 700/295 |
| 2018/0159348 | A1* | 6/2018 | Chang .................. H02J 7/00714 |
| 2021/0111578 | A1* | 4/2021 | Ou .......................... G06F 1/266 |
| 2021/0249887 | A1* | 8/2021 | Yin ....................... H02J 7/0036 |

FOREIGN PATENT DOCUMENTS

| CN | 105022468 A | 11/2015 |
| TW | 201140322 A1 | 11/2011 |
| TW | 201242212 A1 | 10/2012 |
| TW | 201339843 A | 10/2013 |

* cited by examiner

*Primary Examiner* — Julian D Huffman
*Assistant Examiner* — Sadia Kousar
(74) *Attorney, Agent, or Firm* — Winston Hsu (57) ABSTRACT

A charging system includes a primary power source, a power source controller coupled to the primary power source, a first switch, a third switch, and a first port. The power source controller includes an auxiliary power source, a first auxiliary power terminal coupled to the auxiliary power source for providing a first detection current, and a load detection circuit. The power source controller initially sets the first switch to be off, the third switch to be on, and the first auxiliary power terminal to provide the first detection current to the first port through the third switch. When the first detection current is less than a threshold value, the power source controller maintains the first switch to be off, the third switch to be on, and the first auxiliary power terminal to provide the first detection current through the third switch.

20 Claims, 5 Drawing Sheets

CHARGING SYSTEM AND CHARGING METHOD OF UNIVERSAL SERIAL BUS

BACKGROUND OF THE INVENTION

1. Field of the Invention

The present invention is related to a charging system and method, particularly to a charging system and method that can be implemented in universal serial bus.

2. Description of the Prior Art

In the past few years, various mobile devices, such as laptops and mobile phones, all used different charging interfaces. Chargers on the market were not compatible to one other, resulting in wasting resources and environmental waste issues. Trying to solve this problem, USB-IF (Universal Serial Bus Implementers Forum) promoted USB Power Delivery (USB-PD) charging. The well-known devices such as MacBook, iPhone . . . etc., all use the USB-PD protocol and USB Type-C interface for fast charging. USB-PD can cover mobile phones, digital cameras, mobile devices, external storage peripherals, laptops, displays and many other types of electronic devices allowing all charging and data transmission to be shared by a single wire.

In terms of charging and power supply specifications, USB Power Delivery includes the following charging profiles: profile (providing 5V/2A, 10 W power supply), profile 2 (providing 5V/2A and 12V/1.5A, 10-18 W power supply), profile 3 (providing 5V/2A and 12V, 3A, 10~36 W power supply), profile 4 (provides 5V/2A, 20V/3A, 10~60 W power supply), and profile 5 (provides 5V/2A, 20V/5A, 10~100 W power supply).

The USB-PD specification defines a power provider and a power consumer respectively on each end. Both ends have data communication and power chips (Super Speed Inter-Chip; SSIC), and use 23.2 MHz VBUS to transmit and receive carrier frequency and 300 kbps transmission speed to transmit Frequency Shift Keying (FSK) signal, and determine the actual voltage value and current value sent. The USB-PD 2.0 specification can support the new non-directional Type-C connector, and two-way communication through the bus to determine the charging voltage and current.

Although USB-PD has many advantages and functions, various manufacturers are not willing to give up the existing charging specification. As a result, most chargers on the market emphasize multi-interface applications (Type-A and Type-C) and compatibility with various protocols. However, this causes various incompatibility or failure during charging operation. In multi-interface chargers, after a non-standard USB-PD charging wire, Apple Lightning for example, is plugged into the charging interface, the system cannot determine whether it is connected to a device or not. In the existing multi-interface charging technology, each charging interface uses a complete set of power supply paths, the Type-C interface uses a PD chip, and the Type-A interface directly connects to power supply. The disadvantage of this type of charger is that the cost is higher, and the Type-A interface does not have fast charging capability.

SUMMARY OF THE INVENTION

The present invention provides a charging system including a primary power source, a power source controller coupled to the primary power source, a first switch, a third switch, and a first port. The power source controller includes an auxiliary power source, a first auxiliary power terminal coupled to the auxiliary power source for providing a first detection current, and a load detection circuit. The first switch includes a first terminal coupled to the primary power source, a second terminal, and a control terminal coupled to the power source controller. The third switch includes a first terminal coupled to the first auxiliary power terminal, a second terminal, and a control terminal coupled to the power source controller. The first port is coupled to the second terminal of the first switch and the second terminal of the third switch. The power source controller initially sets the first switch to be off, the third switch to be on, and the first auxiliary power terminal to provide the first detection current to the first port through the third switch. When the first detection current is less than a threshold value, the power source controller maintains the first switch to be off, the third switch to be on, and the first auxiliary power terminal to provide the first detection current through the third switch.

The present invention provides a charging method for a universal serial bus (USB). The charging system of the USB includes a primary power source, a power source controller, a first switch, a second switch, a third switch, a fourth switch, a first port, and a second port. The power source controller comprises a auxiliary power source, a load detection circuit, a first auxiliary power terminal coupled to the auxiliary power source, and a second auxiliary power terminal coupled to the auxiliary power source. The first auxiliary power terminal is used for providing a first detection current. The second auxiliary power terminal is used for providing a second detection current. The power source controller is coupled to the primary power source. A first terminal of the first switch is coupled to the primary power source. A control terminal of the first switch is coupled to the power source controller. A first terminal of the second switch is coupled to the primary power source. A control terminal of the second switch is coupled to the power source controller. A first terminal of the third switch is coupled to the first auxiliary power terminal. A control terminal of the third switch is coupled to the power source controller. A first terminal of the fourth switch is coupled to the second auxiliary power terminal. A control terminal of the fourth switch is coupled to the power source controller. The first port is coupled to a second terminal of the first switch and a second terminal of the third switch. The second port is coupled to a second terminal of the second switch and a second terminal of the fourth switch. The method includes the power source controller turning off the first switch and the second switch and turning on the third switch and the fourth switch, the auxiliary power source providing the first detection current to the first port and the second detection current to the second port, when the load detection circuit detects that the first detection current is less than a threshold value, the power source controller determining that the first port is disconnected, or a first wire connected the first port is floating, and the power source controller maintaining the first switch to be off and the third switch to be on, when the load detection circuit detects that the first detection current is greater than the threshold value, the load detection circuit determining that the first wire connected to the first port is coupled to a first device, when the load detection circuit determines that the first wire is coupled to the first device, the power source controller setting the primary power source with a first power capability option, turning off the third switch and turning on the first switch to enable the primary power source to provide a first output power to a first device through the first switch, the first output power being corresponding to the first power capability option, the power source controller communicating a power profile with the first device and selecting a power capability option from the power profile to determine a first output power level, and the power source controller controlling the primary power source to provide the first output power to the first device. The power profile includes the first power capability option and a plurality of other power capability options.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
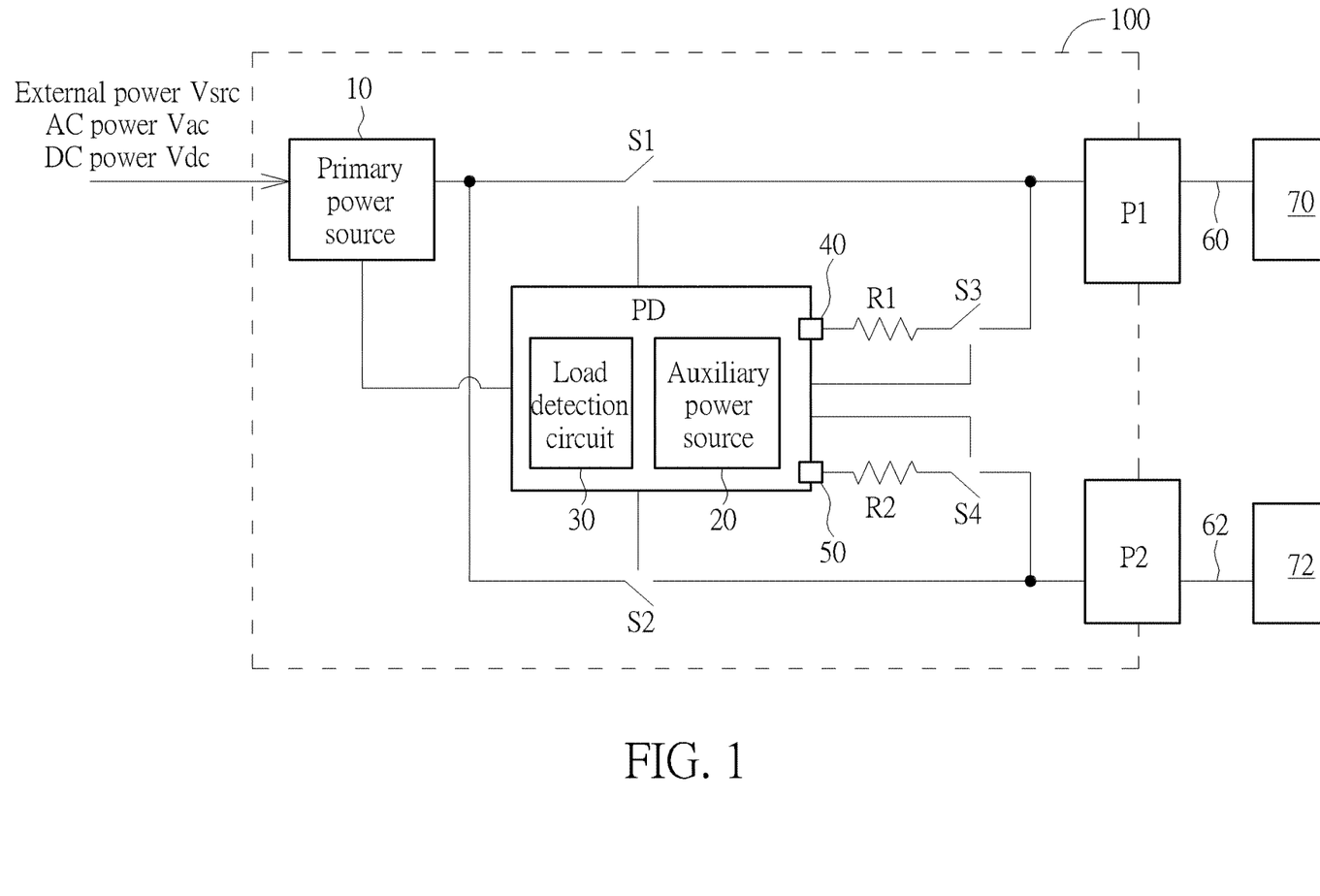
FIG. 1 is a diagram of a charging system of an embodiment of the present invention.

FIG. 1 is a diagram of a charging system 100 of an embodiment of the present invention. The charging system 100 includes a primary power source 10, a power source controller PD, a first switch S1, a second switch S2, a third switch S3, a fourth switch S4, a first port P1, and a second port P2. The primary power source 10 can receive the power input of the external power supply Vsrc, and the external power supply Vsrc can be a commercial AC power supply Vac or a battery pack DC power supply Vdc of a mobile charger. The primary power source 10, for example, may include a flyback converter. If he external power supply Vsrc is an AC power supply Vac, the primary power source 10 receives instructions from the power source controller PD to convert the AC power supply Vac output to DC power of different voltages. However, the primary power source 10 of the embodiment is not limited to a flyback converter, but can include any converter well-known to those skilled in the art.

The first port P1 can be selectively connected to the first device 70, and the second port P2 can be selectively connected to the second device 72. The first device 70 and the second device 72 can be, for example, mobile phones, laptops or tablets. The power source controller PD includes an auxiliary power source 20, a load detection circuit 30, a first auxiliary power terminal 40, and a second auxiliary power terminal 50. The first auxiliary power terminal 40 and the second auxiliary power terminal 50 are both coupled to the auxiliary power source 20. The auxiliary power source 20 can provide a first detection current through the first auxiliary power terminal 40, and the auxiliary power source 20 can provide a second detection current through the second auxiliary power terminal 50. The power source controller PD is coupled to the primary power source 10. The first terminal of the first switch S1 and the first terminal of the second switch S2 are both coupled to the primary power source 10. The first terminal of the third switch S3 is coupled to the first auxiliary power terminal 40. The first terminal of the fourth switch S4 is coupled to the second auxiliary power terminal 50. The control terminal of the first switch S1, the control terminal of the second switch S2, the control terminal of the third switch S3, and the control terminal of the fourth switch S4 are coupled to the power source controller PD through different paths. The first port P1 is coupled to the second terminal of the first switch S1 and the second terminal of the third switch S3. The second port P2 is coupled to the second terminal of the second switch S2 and the second terminal of the fourth switch S4. The charging system 100 further includes a first current limiting device R1 and a second current limiting device R2. The first current limiting device R1 may be coupled between the first auxiliary power terminal 40 and the third switch S3 to form a part of the first power path. The second current limiting device R2 can be coupled between the second auxiliary power terminal 50 and the fourth switch S4 to form a part of the second power path.

The power source controller PD, such as a USB Power Delivery control chip, can be used to control the first switch S1, the second switch S2, the third switch S3, and the fourth switch S4, and also to manage the power transmission to the first port P1 and the second port P2. The load detection circuit 30 is for detecting the variation of the first detection current and the second detection current to determine the connection status of the first port P1 and/or the second port P2. In addition, in the embodiment, the first port P1 may be an interface complied with the USB-PD specification, and the second port P2 may be an interface not complied with the USB-PD specification. However, the charging system 100 of the present invention is not limited to including the first port P1 being an interface complied with the USB-PD specification, and the second port P2 being an interface not complied with the USB-PD specification. Any embodiment including at least one first port P1 that complies with the USB-PD specification and the at least one second port P2 that does not comply with the USB-PD specification, should be within the scope of this embodiment.

Figure 2A:
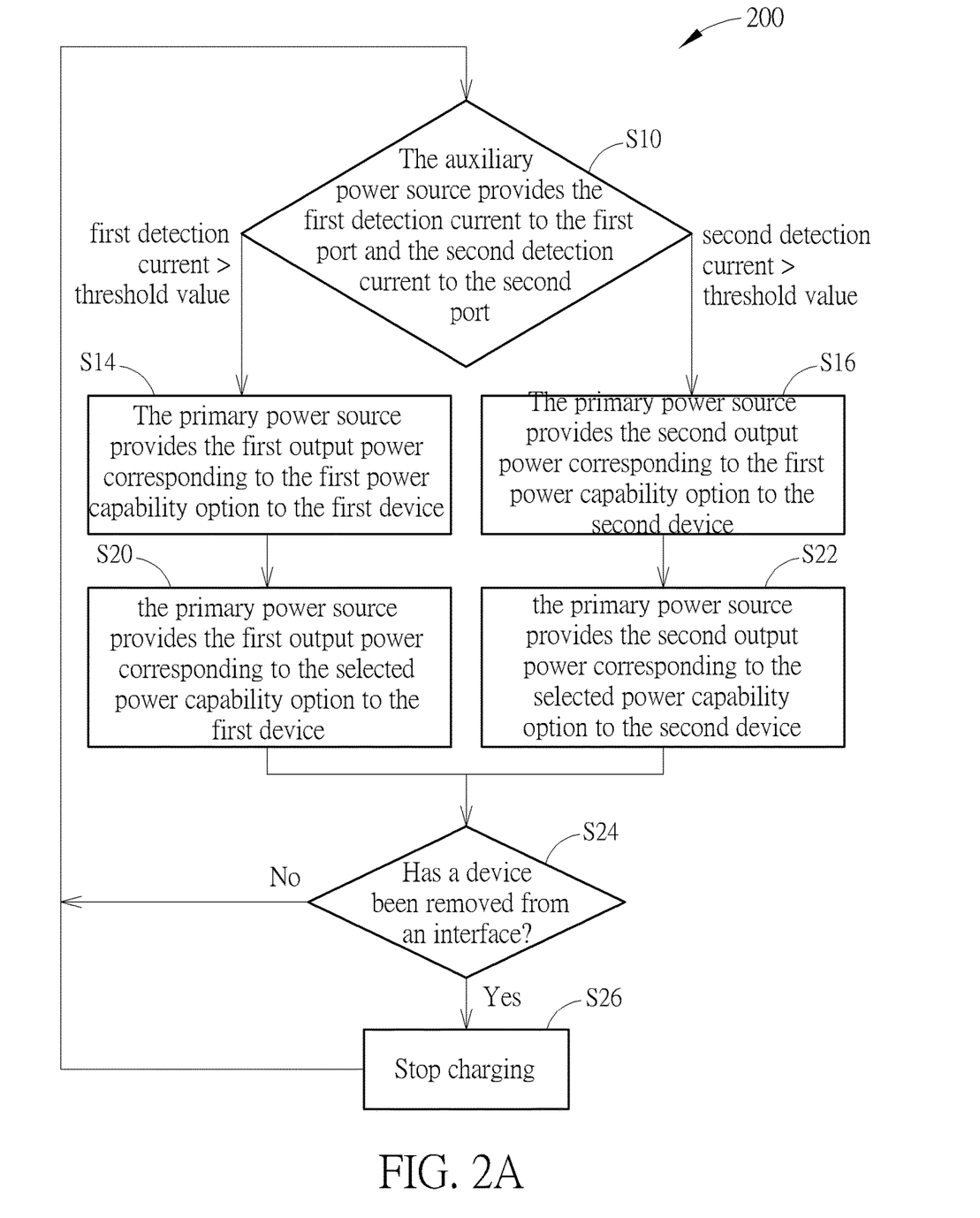
FIGS. 2A-2C are flowcharts of methods for determining the coupling status and power supply of the charging system in FIG. 1.

FIG. 2A is a flowchart of a method 200 for determining the coupling status and power supply of the charging system 100. The method 200 includes the following steps:

S10: The power source controller PD turns off the first switch S1 and the second switch S2, and turns on the third switch S3 and the fourth switch S4. The auxiliary power source 20 provides the first detection current to the first port P1 and the second detection current to the second port P2; the power source controller PD has a power profile; the power source controller PD can set the primary power source 10 according to the power profile, and the power profile includes a plurality of power capability options; the plurality of power capability options include the first power capability option and a plurality other power capability options; the first power capability option enables the output power of the primary power source 10 to be an acceptable charging power (for example, 5V) for most devices to be charged; the plurality of other power capability options are different from the first power capability option, and the plurality of other power capability options can enable the primary power source 10 to have different output powers (for example: 3.3V, 9V, 15V . . . ); if the first detection current increases from less than a threshold value to be greater than the threshold value, go to step S14; if the second detection current changes from less than the threshold value to be greater than the threshold value, go to step S16;

S14: The power source controller PD determines that the first port P1 is connected to the first device 70; the power source controller PD turns off the third switch S3 and turns on the first switch S1, and the power source controller PD sets the primary power source 10 with the first power capability option making the first output power corresponding to the first power capability option; the primary power source 10 provides the first output power to the first device 70 through the first switch S1; go to step S20;

S16: The power source controller PD determines that the second port P2 is connected to the second device 72, the power source controller PD turns off the fourth switch S4 and turns on the second switch S2, and the power source controller PD sets the primary power source 10 with the first power capability option making the second output power corresponding to the first power capability option; the primary power source 10 provides a second output power to the second device 72 through the second switch S2; go to step S22;

S20: The first device 70 handshakes with the power source controller PD through a signal line, and the power source controller PD provides the power profile to the first device 70; after handshake communication between the two parties, the first device 70 provides the first device requested power capability option to the power source controller PD, the power profile including the first power capability option and a plurality of other power capability options; the first device requested power capability option may be the first power capability option or one of a plurality of other power capability options; and the power source controller PD uses the first device requested power capability option to set the primary power source 10 so as to change the first output power to a power corresponding to the selected power capability option; the primary power source 10 provides the first output power through the first switch S1 to charge the first device 70; go to step S24;

S22: The second device 72 handshakes with the power source controller PD through a signal line; the second device 72 provides the second device requested power capability option to the power source controller PD; the power profile including the first power capability option and a plurality of other power capability options; the second device requested power capability option may be the first power capability option or one of a plurality of other power capability options; after handshake communication between the two parties, the power source controller PD uses the second device requested power capability option to set the primary power source 10 so as to change the second output power to a power corresponding to the selected power capability option; the primary power source 10 provides the second output power through the second switch S2 to charge the second device 72;

S24: Determine whether the first device 70 has been removed from the first port P1, or the second device 72 has been removed from the second port P2; if yes, go to step S26; if no, go to step S10; and S26: The primary power source 10 stops charging; go to step S10.

In step S24, the charging system 100 can detect whether the first device 70 has been removed from the first port P1, or whether the second device 72 has been removed from the second port P2. In step S26, the power source controller PD can control the corresponding switch to make the primary power source 10 stop charging to the interface that has been disconnected, and go to step S10 to detect whether a device has been connected to the interface.

In step S24, assuming that the first device 70 is the only device connected to the charging system 100, and the first device 70 has not been removed from the first port P1, it would go to step S10 to detect whether there is another device connected to the other interface. If no other device is connected to the other interface (for example, the second detection current is maintained at less than the threshold value), the first device 70 would be charged with the power capability option selected in step S20; if in step S10, another device is connected to the other interface (for example, the second detection current is changed to greater than the threshold value), the method 500 in FIG. 4 should be used to find the most proper power capability option. The method 500 is used when the first port P1 and the second port P2 are respectively coupled to different devices. In FIG. 2A, steps S20 and S22 describe detail procedures of the handshake communication between the first device 70 and the second device 72, and the power source controller PD.

Figure 2B:
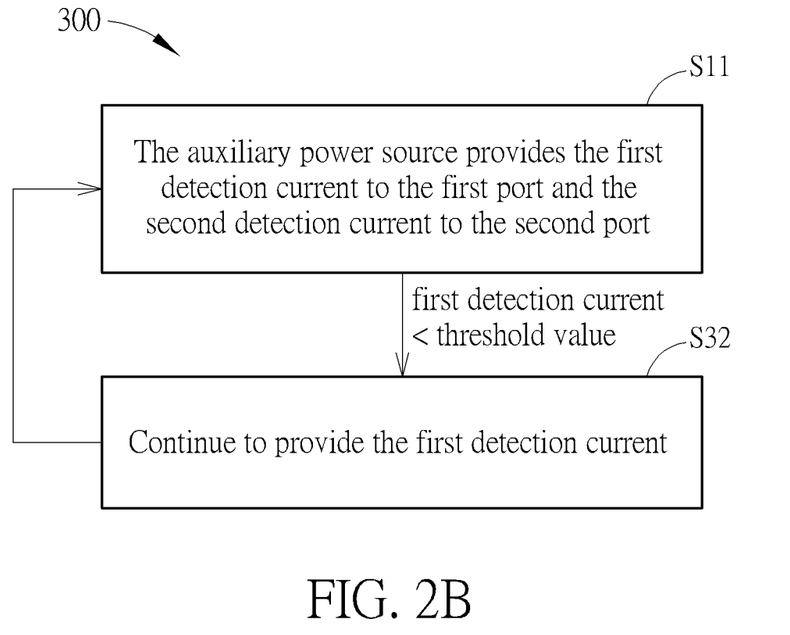

FIG. 2B is a flowchart of a method 300 for determining the coupling status and power supply of the charging system 100. The method 300 includes the following steps:

S11: The power source controller PD turns off the first switch S1 and the second switch S2 and turns on the third switch S3 and the fourth switch S4; the auxiliary power source 20 provides the first detection current to the first port P1 and the second detection current to the second port P2; and S32: When the first detection current is less than the threshold value, the power source controller PD maintains the first switch S1 to be off and the third switch S3 to be on, and maintains the first auxiliary power terminal 40 to provide the first detection current through the third switch S3; return to step S11.

Figure 2C:
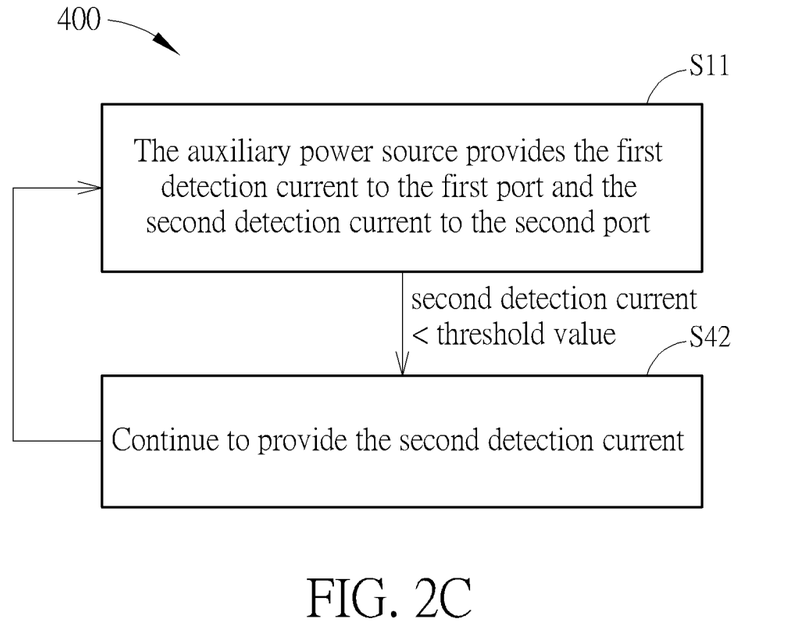

FIG. 2C is a flowchart of a method 400 for determining the coupling status and power supply of the charging system 100. The method 400 includes the following steps:

S11: The power source controller PD turns off the first switch S1 and the second switch S2 and turns on the third switch S3 and the fourth switch S4; the auxiliary power source 20 provides the first detection current to the first port P1 and the second detection current to the second port P2; and S42: When the second detection current is less than the threshold value, the power source controller PD maintains the second switch S2 to be off and the fourth switch S4 to be on, and maintains the second auxiliary power terminal 42 to provide the second detection current through the fourth switch S4; return to step S11.

In the embodiment, the output power may be according to USB-PD specification, for example, 5V, 9V or 15V. The first device and the second device can be any device that uses USB to charge, such as mobile phones, digital cameras, external storage peripherals, laptops, displays, etc.

If the first detection current is less than the threshold value, for example 0.5 mA, the load detection circuit 30 can determine that a first wire 60 connected to the first port P1 is floating, and the power source controller PD maintains the first switch S1 to be off and the third switch S3 to be on. The first detection current is provided by the first auxiliary power terminal 40 through the third switch S3. When the first detection current is greater than the threshold value, the load detection circuit 30 can determine that the first port P1 is coupled to the first device 70, and the power source controller PD is triggered to turn off the third switch S3, and turn on the first switch S1. The power source controller PD sets the primary power source 10 with the first power capability option, so that the primary power source 10 provides a first output power, such as 5V, to the first device 70 through the first switch S1. In this way, the primary power source 10 can provide output power through the first switch S1 only when the first wire 60 connected to the first port P1 is coupled to the first device 70.

FIGS. 3A-3D are diagrams of charging current for determining the coupling status of the charging system 100. In the embodiment, the method using the load detection circuit 30 to determine the coupling status of the first port P1 is as follows.

Figure 3A:
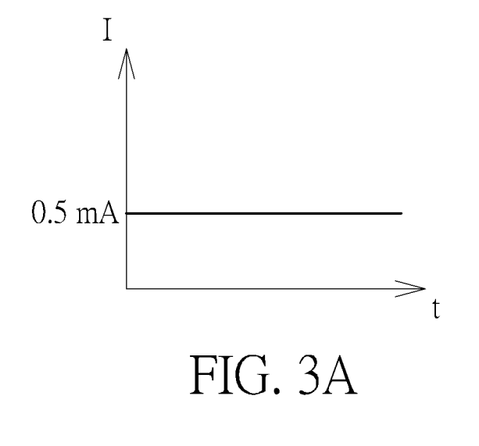
FIGS. 3A-3D are diagrams of charging current for determining the coupling status of the charging system in FIG. 1.

As shown in FIG. 3A, if the first detection current is greater than 0 mA and less than 2 mA, such as 0.5 mA, it can be determined that the first wire 60 connected to the first port P1 is a floating active wire. The first wire 60 continues to consume the lower current 0.5 mA. The active wire in this case refers to, for example, a charging wire with power-consuming components such as LED indicators or integrated circuits.

Figure 3B:
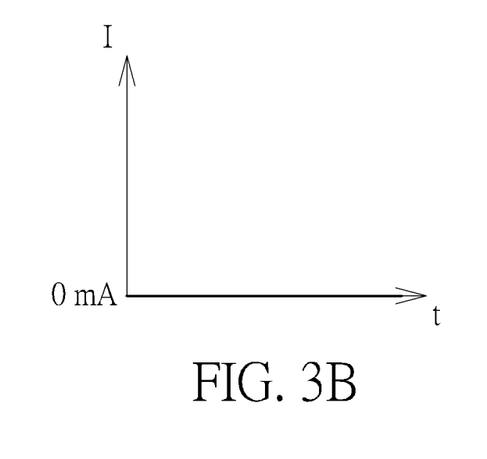

As shown in FIG. 3B, if the first detection current is substantially maintained at 0 mA, it can be determined that the first port P1 is not connected to any wire or the first wire 60 is a floating passive wire. The passive wire in this case refers to, for example, a charging wire without a power-consuming component.

Figure 3C:
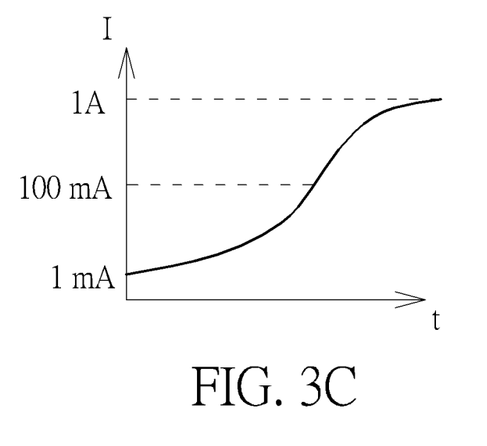

As shown in FIG. 3C, if the first detection current rises from less than 2 mA (for example, 1 mA) to more than 100 mA (for example, LA), it can be determined that the first wire 60 connected to the first port P1 is an active wire coupled to the first device 70.

Figure 3D:
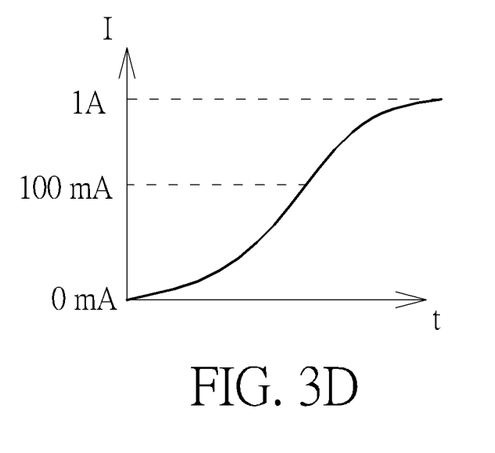

As shown in FIG. 3D, if the first detection current rises from substantially 0 mA to greater than 100 mA, for example, 1A, it can be determined that the first wire 60 connected to the first port P1 is a passive wire and is coupled to the first device 70. Using the load detection circuit 30 to determine the coupling status of the second port P2 is similar and will not be repeated here.

Figure 4:
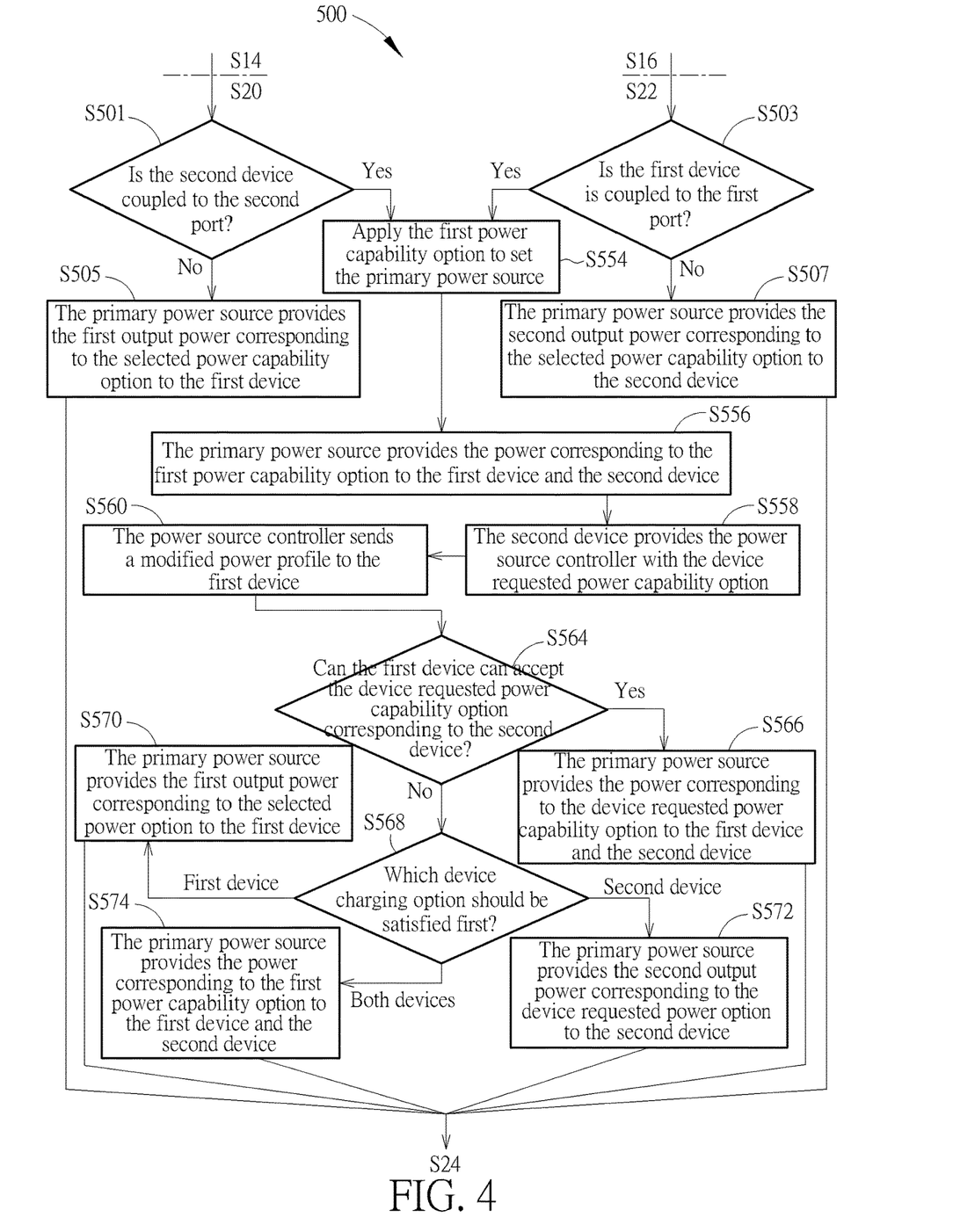
FIG. 4 is a flowchart of a handshaking communication method for the first device, the second device and the power source controller.

FIG. 4 is a flowchart of a handshaking communication method 500 for the first device 70, the second device 72 and the power source controller PD. The method 500 includes the following steps:

S501: Determine whether the second device 72 is coupled to the second port P2; if yes, go to step S554; if no, go to step S505;

S503: Determine whether the first device 70 is coupled to the first port P1; if yes, go to step S554; if no, go to step S507;

S505: The first device 70 communicates with the power source controller PD through a signal line, and the power source controller PD provides a power profile to the first device 70; after handshake communication between the two parties, the first device 70 selects a power capability option from the power profile, and the power source controller PD sets the primary power source 10 according to the selected power capability option; the first output power is updated to correspond to the selected power capability option, and the primary power source 10 provides the first output power through the first switch S1 to charge the first device 70; go to step S24;

S507: The second device 72 communicates with the power source controller PD through a signal line, and the second device 72 provides the power source controller PD with a second device requested power capability option; the power source controller PD sets the primary power source 10 according to the second device requested power capability option and updates the second output power to correspond to the second device requested power capability option; the primary power source 10 provides the second output power through the second switch S2 to charge the second device 72; go to step S24;

S554: When a plurality of devices are connected to the charging system 100, apply the first power capability option to set the primary power source 10 to output the power corresponding to the first power capability option, for example, 5V; this avoids interrupting the charging process of the original device, and avoids damaging the newly connected device;

S556: The first switch S1 and the second switch S2 are both turned on; the primary power source 10 provides the power corresponding to the first power capability option to the first device 70 through the first switch S1, and the primary power source 10 provides the power corresponding to the first power capability option to the second device 72 through the second switch S2;

S558: The second device 72 communicates with the power source controller PD, and the second device 72 provides the power source controller PD with the second device requested power capability option;

S560: The first device 70 communicates with the power source controller PD; the power source controller PD sends a modified power profile to the first device 70; the modified power profile includes the first power capability option and the second device requested power capability option provided by the second device 72;

S564: Determine whether the first device 70 can accept the second device requested power capability option corresponding to the second device 72? If yes, go to step S566; if no, go to step S568;

S566: The power source controller PD sets the primary power source 10 according to the second device requested power capability option corresponding to the second device 72; the primary power source 10 provides the power corresponding to the second device requested power capability option through the first switch S1 and the second switch S2 respectively to the first device 70 and the second device 72; go to step S24;

S568: According to the factory or user settings of the charging system 100, the power source controller PD determines whether to fast charge the first device 70, to fast charge the second device 72, or to charge both with a lower voltage; if the power source controller PD determines to fast charge the first device 70, go to step S570; if the power source controller PD determines to fast charge the second device 72, go to step S572; otherwise, go to step S574;

S570: The power source controller PD turns off the second switch S2; the first device 70 communicates with the power source controller PD through the signal line, and the power source controller PD provides the power profile in step S505 to the first device 70; after handshake communication between the two parties, the first device 70 selects a power capability option from the power profile in step S505, and the power source controller PD then sets the primary power source 10 according to the selected power capability option; the first output power is updated to the power corresponding to the selected power capability option; the primary power source 10 provides the first output power through the first switch S1 to fast charge the first device 70; go to step S24;

S572: The power source controller PD turns off the first switch S1 and sets the primary power source 10 according to the second device requested power capability option provided by the second device 72; the second output power is updated to the power corresponding to the second device requested power capability option provided by the second device 72; the primary power source 10 provides the second output power through the second switch S2 to fast charge the second device 72; go to step S24; and S574: The power source controller PD sets the primary power source 10 with the first power capability option to output the power corresponding to the first power capability option for example, 5V, to the first device 70 and the second device 72; the fast charging capability is discarded, but the plurality of devices connected to the charging system 100 can continue to be charged simultaneously; go to step S24.

In step 566, when the power source controller PD intends to update the original power capability option (for example, 5V) with another power capability option corresponding to a higher voltage (for example, 12V), before updating, the power source controller PD can perform the following safety check steps.

(1) Check that the secondary power paths (third switch S3 and fourth switch S4) corresponding to the first port P1 and the second port P2 that are currently connected to the devices are both turned off, and the corresponding primary power paths (the first switch S1 and the second switch S2) are turned on, so as to avoid unnecessary power loss at the secondary power paths.

(2) If the charging system 100 includes a third interface that is not yet coupled to any device, the power source controller PD would first check to confirm that a fifth switch on the primary power path corresponding to the third interface has been turned off; when a third device is later coupled to the third interface, this can prevent a higher voltage corresponding to another power capability option damaging the third device.

In summary, the charging system and method for the universal serial bus of the present invention can simultaneously detect whether the charging wires coupled to a plurality of USB charging interfaces are floating, and enable a plurality of USB charging interfaces to provide higher output powers simultaneously in a low-cost manner. This overcomes the incompatibility or abnormal operation of various multi-port charging technologies, and achieves energy saving and full use of the advantages of fast charging provided by USB Power Delivery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging system comprising:
   a primary power source;
   a power source controller coupled to the primary power source, comprising:
      an auxiliary power source;
      a first auxiliary power terminal coupled to the auxiliary power source, and configured to provide a first detection current; and
      a load detection circuit;
   a first switch comprising:
      a first terminal coupled to the primary power source;
      a second terminal; and
      a control terminal coupled to the power source controller;
   a third switch comprising:
      a first terminal coupled to the first auxiliary power terminal;
      a second terminal; and
      a control terminal coupled to the power source controller; and
   a first port coupled to the second terminal of the first switch and the second terminal of the third switch;
   wherein:
      the power source controller stores a preset no-load threshold current, representing a state in which the first port being disconnected or a first wire connected to the first port is floating;
      the power source controller initially sets the first switch to be off, the third switch to be on, and the first auxiliary power terminal to provide the first detection current to the first port through the third switch; and
      when the first detection current is less than the preset no-load threshold value, the power source controller determines that no load is coupled to the first port and maintains the first switch to be off, the third switch to be on, and the first auxiliary power terminal to provide the first detection current through the third switch.

2. The charging system of claim 1, wherein the power source controller further comprises a second auxiliary power terminal coupled to the auxiliary power source, and configured to provide a second detection current, and the charging system further comprises:
   a second switch comprising:
      a first terminal coupled to the primary power source;
      a second terminal; and
      a control terminal coupled to the power source controller;
   a fourth switch comprising:
      a first terminal coupled to the second auxiliary power terminal;
      a second terminal; and
      a control terminal coupled to the power source controller; and
   a second port coupled to the second terminal of the second switch and the second terminal of the fourth switch;
   wherein:
      the power source controller initially sets the second switch to be off, the fourth switch to be on, and the second auxiliary power terminal provides the second detection current to the second port through the fourth switch; and
      when the second detection current is less than the threshold value, the power source controller determines that no load is coupled to the second port and maintains the second switch to be off, the fourth switch to be on, and the second auxiliary power terminal to provide the second detection current through the fourth switch.

3. The charging system of claim 2 further comprising:
   a first current limiting device coupled to the third switch to form a first power path, the first power path being coupled between the first auxiliary power terminal and the first port; and
   a second current limiting device coupled to the fourth switch to form a second power path, and the second power path being coupled between the second auxiliary power terminal and the second port.

4. The charging system of claim 2, wherein:
   the power source controller has a power profile comprising a first power capability option and a plurality of other power capability options, and the plurality of other power capability options are different from the first power capability option; and
   when the first detection current is greater than the threshold value, the power source controller determines that the first port is connected to a first device, the power source controller sets the primary power source to the first power capability option, turns off the third switch and turns on the first switch, and the primary power source provides a first output power to the first device through the first switch, the first output power being corresponding to the first power capability option.

5. The charging system of claim 4, wherein when the first device is receiving the first output power, the power source controller communicates with the first device to provide the power profile, and selects a power capability option from the power profile to set the primary power source.

6. The charging system of claim 5, wherein the first power capability option is 5V, and the plurality of other power capability options are not 5V.

7. The charging system of claim 5, wherein:
the power source controller provides the power profile to the first device;
the first device selects a power capability option from the power profile to reply to the power source controller; and
the power source controller sets the primary power source according to the selected power capability option.

8. The charging system of claim 4, wherein when the second detection current is greater than the threshold value, the power source controller determines that the second port is connected to a second device, the power source controller sets the primary power source to the first power capability option, turns off the fourth switch and turns on the second switch, and the primary power source provides a second output power to the second device through the second switch, the second output power being corresponding to the first power capability option.

9. The charging system of claim 8, wherein:
when the second device is receiving the second output power, the second device provides the power source controller with a device requested power capability option; and
when the first detection current is less than the threshold value, the power source controller sets the primary power source according to the device requested power capability option, and the device requested power capability option is different from the first power capability option.

10. The charging system of claim 4, wherein when the first detection current is greater than the threshold value and the second detection current is greater than the threshold value, the power source controller determines that the first port is connected to the first device and the second port is connected to a second device, the power source controller sets the primary power source with the first power capability option, the power source controller turns off the third switch and the fourth switch, and turns on the first switch and the second switch, and the primary power source provides an output power corresponding to the first power capability option to the first device and the second device through the first switch and the second switch, respectively.

11. The charging system of claim 10, wherein the second device provides the power source controller with a device requested power capability option, and the power source controller communicates with the first device to provide a modified power profile, the modified power profile comprising the first power capability option and the device requested power capability option; and if the first device is able to accept the device requested power capability option, the power source controller sets the primary power source according to the device requested power capability option, and the primary power source is updated from the first power capability option to the device requested power capability option.

12. The charging system of claim 11, wherein when the power source controller confirms that the third switch and the fourth switch are both turned off, and the first switch and the second switch are both turned on, the power source controller updates the primary power source from the first power capability option to the device requested power capability option.

13. The charging system of claim 10, wherein the second device provides the power source controller with a device requested power capability option, and the power source controller communicates with the first device to provide a modified power profile, the modified power profile comprising the first power capability option and the device requested power capability option; and if the first device is unable to accept the device requested power capability option, the power source controller sets the primary power source according to a charge setting, the charge setting being selected from a group comprising charging the first device first, charging the second device first, and charging the first device and the second device at a same time.

14. The charging system of claim 1, wherein:
when the first detection current is less than 2 mA, the power source controller determines that the first port is not coupled to any device to be charged; and
when the first detection current increases to be greater than 100 mA, the power source controller determines that the first port is coupled to a first device.

15. A charging method for a universal serial bus (USB), a charging system of the USB comprising a primary power source, a power source controller, a first switch, a second switch, a third switch, a fourth switch, a first port, and a second port, the power source controller comprising an auxiliary power source, a load detection circuit, a first auxiliary power terminal coupled to the auxiliary power source, and a second auxiliary power terminal coupled to the auxiliary power source, the first auxiliary power terminal being used for providing a first detection current, the second auxiliary power terminal being used for providing a second detection current, the power source controller being coupled to the primary power source, a first terminal of the first switch being coupled to the primary power source, a control terminal of the first switch being coupled to the power source controller, a first terminal of the second switch being coupled to the primary power source, a control terminal of the second switch being coupled to the power source controller, a first terminal of the third switch being coupled to the first auxiliary power terminal, a control terminal of the third switch being coupled to the power source controller, a first terminal of the fourth switch being coupled to the second auxiliary power terminal, a control terminal of the fourth switch being coupled to the power source controller, the first port being coupled to a second terminal of the first switch and a second terminal of the third switch, the second port being coupled to a second terminal of the second switch and a second terminal of the fourth switch, and the method comprising:
the power source controller turning off the first switch and the second switch and turning on the third switch and the fourth switch, the auxiliary power source providing the first detection current to the first port and the second detection current to the second port;
when the load detection circuit detects that the first detection current is less than a threshold value, the power source controller determining that the first port is disconnected, or a first wire connected the first port is floating, and the power source controller maintaining the first switch to be off and the third switch to be on;
when the load detection circuit detects that the first detection current is greater than the threshold value, the load detection circuit determining that the first wire connected to the first port is coupled to a first device;

when the load detection circuit determines that the first wire is coupled to the first device, the power source controller setting the primary power source with a first power capability option, turning off the third switch and turning on the first switch to enable the primary power source to provide a first output power to a first device through the first switch, the first output power being corresponding to the first power capability option;

the power source controller communicating a power profile with the first device and selecting a power capability option from the power profile to determine a first output power level; and the power source controller controlling the primary power source to provide the first output power to the first device;

wherein the power profile comprises the first power capability option and a plurality of other power capability options.

16. The method of claim 15, further comprising:

when the load detection circuit detects that the second detection current is less than a threshold value, the power source controller determining that the second port is disconnected, or a second wire connected to the second port is floating; and the power source controller maintaining the second switch to be off and the fourth switch to be on.

17. The method of claim 15 further comprising:

when the load detection circuit detects that the second detection current is greater than a threshold value, the load detection circuit determining that a second wire connected to the second port is coupled to a second device;

when the load detection circuit determines that the second wire is coupled to the second device, the power source controller setting the primary power source with the first power capability option, and turning off the fourth switch and turning on the second switch to enable the primary power source to provide a second output power to the second device through the second switch, the second output power being corresponding to the first power capability option; and the second device providing a device requested power capability option to the power source controller.

18. The method of claim 17, further comprising:

the power source controller communicating with the first device a modified power profile, wherein the modified power profile comprises the first power capability option and the device requested power capability option; and if the first device is able to accept the device request power capability option, the power source controller setting the primary power source according to the device requested power capability option, and the primary power source being updated from the first power capability option to the device requested power capability option.

19. The method of claim 18, wherein when the power source controller confirms that the third switch and the fourth switch are both turned off, and the first switch and the second switch are both turned on, the power source controller updating the primary power source from the first power capability option to the device requested power capability option.

20. The method of claim 17, further comprising:

the power source controller communicating with the first device a modified power profile, wherein the modified power profile comprises the first power capability option and the device requested power capability option; and if the first device is unable to accept the device requested power capability option, the power source controller setting the primary power source according to a charge setting, the charge setting being selected from a group comprising charging the first device first, charging the second device first, or charging the first device and the second device at a same time.

* * * * *